(12) United States Patent
Mcmillan et al.

(10) Patent No.: US 10,318,101 B2
(45) Date of Patent: Jun. 11, 2019

(54) GESTURE-BASED USER INTERFACE AND METHOD FOR NAVIGATING IN THREE-DIMENSIONAL SPACE

(71) Applicant: Mental Canvas LLC, New York, NY (US)

(72) Inventors: Leonard Mcmillan, Chapel Hill, NC (US); Julie Dorsey, Madison, CT (US); Steven Gortler, Waltham, MA (US); Fangyang Shen, Cambridge, MA (US)

(73) Assignee: Mental Canvas LLC, New York, NY (US)

( * ) Notice: Subject to any disclaimer, the term of this patent is extended or adjusted under 35 U.S.C. 154(b) by 496 days.

(21) Appl. No.: 14/610,646

(22) Filed: Jan. 30, 2015

(65) Prior Publication Data

US 2015/0212688 A1 Jul. 30, 2015

Related U.S. Application Data

(60) Provisional application No. 61/933,552, filed on Jan. 30, 2014, provisional application No. 61/933,551, filed on Jan. 30, 2014, provisional application No. 61/933,558, filed on Jan. 30, 2014.

(51) Int. Cl.
*G06T 3/60* (2006.01)
*G06F 3/0481* (2013.01)
*G06F 3/0484* (2013.01)
*G06F 3/0488* (2013.01)

(52) U.S. Cl.
CPC ...... *G06F 3/04815* (2013.01); *G06F 3/04845* (2013.01); *G06F 3/04883* (2013.01); *G06F 2203/04808* (2013.01); *G06T 3/60* (2013.01); *G06T 2219/2016* (2013.01)

(58) Field of Classification Search
CPC . G06T 3/60; G06T 19/003; G06T 2219/2016; G06F 3/04815; G06F 3/04845; G06F 3/04883; G06F 2203/04808
See application file for complete search history.

(56) References Cited

U.S. PATENT DOCUMENTS 9,244,590 B1 * 1/2016 Browder ............. G06F 3/04815
2004/0164956 A1 * 8/2004 Yamaguchi ......... G06F 3/04845
345/156

(Continued)

OTHER PUBLICATIONS

GeekThis, "SketchUp: Always Face Camera Component", Mar. 28, 2013, Youtube.com, https://www.youtube.com/watch?v=SUFnjGM_H58, pp. 1-7.*

(Continued)

*Primary Examiner* — William L Bashore
*Assistant Examiner* — Daniel W Parcher
(74) *Attorney, Agent, or Firm* — Goodwin Procter LLP

(57) ABSTRACT

A computer-implemented method and system for generating on a second canvas within a three-dimensional space a three-dimensional representation of an object disposed on a plane of a first, working canvas without leaving the plane of the first, working canvas, the method including designating an axis of rotation on the plane of the first, working canvas, e.g., a hinge function; and rotating the object about the axis of rotation, i.e., the hinge function, without the object leaving the plane of the first, working canvas.

15 Claims, 14 Drawing Sheets

(56) References Cited

U.S. PATENT DOCUMENTS

| | | | | |
|---|---|---|---|---|
| 2008/0024500 A1* | 1/2008 | Bae | ............... | G06T 11/203 345/442 |
| 2008/0180406 A1* | 7/2008 | Han | ............... | G06F 3/04883 345/173 |
| 2011/0041098 A1* | 2/2011 | Kajiya | ............... | G06F 3/04815 715/849 |
| 2012/0075284 A1* | 3/2012 | Rivers | ............... | G06T 3/4007 345/419 |
| 2012/0154313 A1* | 6/2012 | Au | ............... | G06F 3/04883 345/173 |
| 2013/0127825 A1* | 5/2013 | Joshi | ............... | G06T 19/20 345/419 |
| 2013/0222385 A1* | 8/2013 | Dorsey | ............... | G06T 11/20 345/427 |
| 2013/0227493 A1* | 8/2013 | Schmidt | ............... | G06F 3/04815 715/849 |
| 2013/0307827 A1* | 11/2013 | Reisman | ............... | G06F 3/0425 345/175 |
| 2014/0229871 A1* | 8/2014 | Tai | ............... | G06F 3/04883 715/765 |
| 2015/0029553 A1* | 1/2015 | Fujimoto | ............... | G06F 3/0412 358/1.15 |
| 2016/0041641 A1* | 2/2016 | Xia | ............... | G06F 3/0488 345/175 |

OTHER PUBLICATIONS

Sketchup School, "Sketchup: Face Me Components (Pt.2) | SketchUp Show #19 (Tutorial)", Jan. 15, 2008, Youtube.com, https://www.youtube.com/watch?v=llroywBmCdM, pp. 1-13 (Year: 2008).*

* cited by examiner

GESTURE-BASED USER INTERFACE AND METHOD FOR NAVIGATING IN THREE-DIMENSIONAL SPACE

CROSS-REFERENCE TO RELATED APPLICATIONS

This application claims the benefit of priority to U.S. Provisional Patent Application Nos. 61/933,551, 61/933,552, and 61/933,558, each of which was filed on Jan. 30, 2014 and is incorporated herein by reference.

FIELD OF THE INVENTION

The present invention relates to methods and systems for navigating and sketching in three-dimensional space and, more particularly, to a user interface, system, and method that enable users to create a "hinge" interface on an original, working virtual canvas about which the users, e.g., artists, may create new canvases from new points of view by rotating all or some portion of the original, working virtual canvas about an axis of rotation at the hinge.

BACKGROUND OF THE INVENTION

Conventional sketching software enables users, e.g., artists, to navigate in a three-dimensional space with a fixed number of degrees of freedom. More particularly, sketching software enables artists to create one or more virtual canvases in a three-dimensional (3D) space and, furthermore, to create secondary virtual canvases in the same 3D space. The representative images in 3D space in these secondary virtual canvases, however, predominantly lie in a plane that is parallel to the plane of the original, working virtual canvas.

For example, U.S. Published Patent Application Number 2013/0222385 to Julie Dorsey, et al., which is incorporated in its entirety by reference, appears to disclose a method, system, and an article of manufacture, e.g., a computer program product, for creating and positioning two-dimensional (2D) planes within a 3D space and for making it possible to input and to modify a 2D image on any one of the 2D planes. Although the generated 2D planes may be positioned anywhere within the 3D space, projection of strokes or objects on a first, working virtual canvas is conventionally accomplished by parallel projection and/or by using a pixel graphics approach. Moreover, users may get "lost" in the 3D space, jumping from one canvas to another canvas.

BRIEF SUMMARY OF THE INVENTION

Hence, it would be desirable to provide a method, system, and an article of manufacture that enable artists to create and orient a "hinge" anywhere and at any angle on an original, working virtual canvas in an infinite, three-dimensional (3D) space about which a new virtual canvas on a different two-dimensional (2D) plane within the 3D space can be generated. Advantageously, the method, system, and article of manufacture enable artists to move (e.g., rotate or orbit about an axis defined by the hinge), add or assign existing content to, modify, and the like the new virtual canvas without leaving the plane of the original, working virtual canvas. It would also be desirable to provide a method, system, and an article of manufacture that project and create perspective about the axis defined by the hinge using vector data and vector graphics. As a result, visual accuracy of the object on the original, working virtual canvas can be maintained while changing the viewing position of the object from the original, working virtual canvas to the new virtual canvas.

In a first aspect, In a first aspect, a computer-implemented method for designating an axis of rotation on a two-dimensional plane within a three-dimensional space is disclosed. In some embodiments, the method includes specifying the axis of rotation on a selected plane. In variations of the embodiments, the method further includes rotating an object, e.g., the selected plane, about the axis of rotation to create a second plane and/or rotating a virtual camera about the axis of rotation; and modifying at least one of a location and an orientation of the axis of rotation by manipulating a relative location of each of a pair of points through which the axis of rotation passes. In some implementations, manipulating a relative location of each of the pair of points comprises dragging at least one of a multi-finger gesture and a hand gesture across a touch-sensitive screen to change at least one of the location and the orientation of the pair of points and the axis of rotation; and rotating the object about the axis of rotation comprises swiping a single finger gesture across a touch-sensitive screen in a direction that is perpendicular or substantially perpendicular to the axis of rotation.

In other implementations, the method further includes creating a second plane, e.g., that is oriented frontal-planar to a viewer, that passes through the selected plane by rotating the selected plane about the axis of rotation and/or creating a second plane that passes through the selected plane by rotating the virtual camera about the axis of rotation and creating the second plane such that it is frontal-planar to the rotated virtual camera.

In a second aspect, a computer-implemented method that facilitates the generation of a three-dimensional representation of an object disposed on a first, working virtual canvas within a three-dimensional space on a second virtual canvas is disclosed. In some embodiments, the method includes designating an axis of rotation on the first, working canvas and rotating the object, which could be the entire canvas, or a virtual camera about the axis of rotation. In some implementations, designating an axis of rotation includes identifying on the plane of the first, working canvas a pair of points through which the axis of rotation passes and, more specific ally, using a finger gesture and/or a hand gesture to designate a location and an orientation of the axis of rotation on the plane of the first, working canvas and/or identifying on the plane of the first, working canvas a pair of points through which the axis of rotation passes. In some variations, the method further includes modifying a location and/or orientation of the axis of rotation by manipulating a relative location of one or both of the points. For example, manipulating a relative location of each of the pair of points may include dragging a multi-finger gesture and/or a hand gesture across a touch-sensitive screen to change the location and/or the orientation of the pair of points and the axis of rotation.

In some implementations, the method also includes manipulating a vector stroke(s) of an object on the first, working canvas to the second canvas by projecting selected vector strokes from a center position of the virtual camera to a desired target on the second canvas and/or comprising controlling a central projection of data by moving the second canvas using the axis of rotation. In some variations, rotating the object about the axis of rotation may include transferring vector data of the object from the first, working canvas to the second canvas and/or changing a point of view of some portion of the object in the three-dimensional space. In some variations, the point of view of the object is taken from a fixed location relative to the axis of rotation. Advantageously, the visual accuracy of the object is maintained while changing the point of view of the object from the first, working canvas to the second canvas.

In a third aspect, a system generates a three-dimensional representation of an object disposed on a plane of a first, working canvas within a three-dimensional space on a second canvas without leaving the plane of the first, working canvas. In some embodiments, the system includes a programmable processor and memory for storing machine-readable instructions executable by the processor. When executed, the instructions designate an axis of rotation on the plane of the first, working canvas and rotate the object and/or a virtual camera about the axis of rotation.

In a fourth aspect, an article of manufacture having computer-readable program portions embedded thereon generates a three-dimensional representation of an object disposed on a plane of a first, working canvas on a second canvas within a three-dimensional space. In some embodiments, the embedded instructions designate an axis of rotation on the plane of the first, working canvas and facilitate the rotation of the object or a virtual camera about the axis of rotation.

BRIEF DESCRIPTION OF THE DRAWINGS

Further features, embodiments, and advantages of the present invention will become apparent from the following detailed description with reference to the drawings, wherein.

DETAILED DESCRIPTION OF THE INVENTION

The present invention provides an improvement to a three-dimensional-based sketching software package by which an object can be generated on a virtual canvas in an infinite, three-dimensional (3D) space without regard to or specification of the position of the object within the 3D space. For the purpose of illustration and not limitation an object can be a two-dimensional (2D) plane, i.e., the plane on which the working virtual canvas is displayed in a frontal-planar manner, or some discrete element or all of the elements on the 2D plane, e.g., a stoke(s), content, sketches, cartoons, comics, images, drawings, photographs, text, videos, and the like. The improvement provides a method for generating, on a second virtual canvas within the same 3D space, a 3D representation of the object disposed on the first or original, working virtual canvas. Advantageously, according to the present invention, generating the object on the second virtual canvas can occur without leaving the plane of the first, working virtual canvas. With this feature, users, e.g., artists, will be less likely to get lost or lose their way or place and orientation within the 3D space. Moreover, regardless of the amount of rotation about the hinge, users will be able to view the new canvas in a frontal-planar orientation.

Furthermore, the present invention provides a graphical tool, e.g., graphical system components, computer graphical object visualization tools, computer graphical manipulation tools, a user interface, and the like, that allows users, e.g., artists, to move, modify, and/or manipulate the object on a frontal-planar, working virtual canvas as well as to move, modify, rotate, and/or manipulate the 2D plane of the working virtual canvas, to generate a 3D representation of a desired virtual scene. Advantageously, the improvement includes creating or generating and positioning or re-positioning a "hinge" feature anywhere on the infinite 2D plane of the first or original, working virtual canvas and, moreover, enabling a user to rotate or orbit the original, working virtual canvas about an axis of rotation defined by the location and orientation of the hinge. Furthermore, rotating the original, working virtual canvas about the axis of rotation defined by the hinge changes the point of view of a virtual camera, i.e., the viewing angle, as the original, working virtual canvas is moved around the axis of rotation in 3D space. Rotation about the axis or rotation at the hinge potentially creates an infinite number of new canvases—each of which lies or is positioned at some angle to the 2D plane of the original, working virtual canvas. Moreover, regardless of the viewing angle, the object remains in the original, working virtual canvas as it is rotated at the hinge. This feature enables the user and viewers to view the 3D virtual scene from an infinite number of viewing angles without leaving the plane of the original, working virtual canvas.

Figure 1:
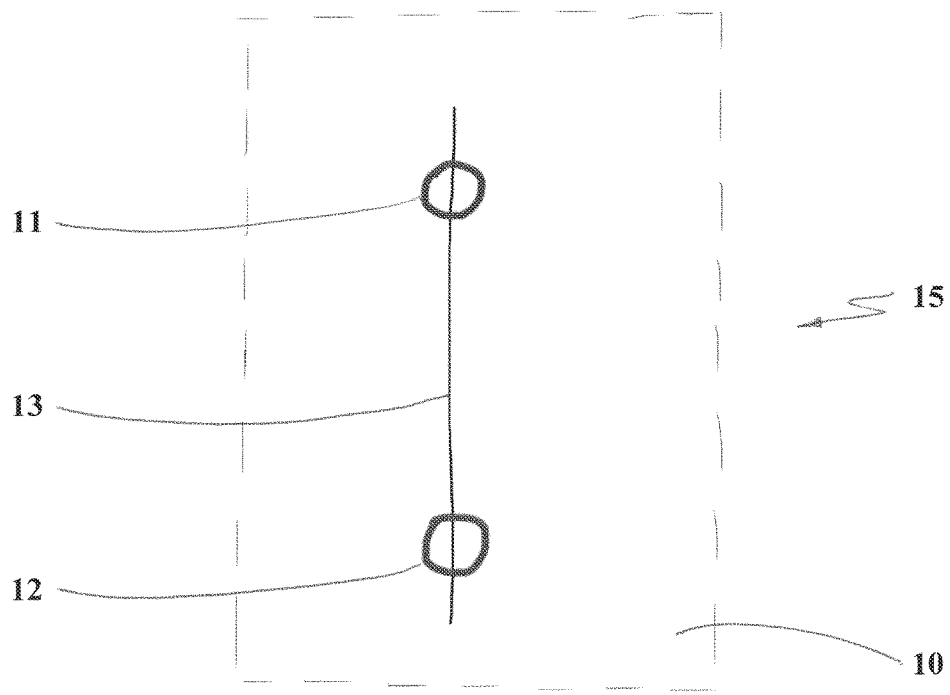
FIG. 1 shows a diagrammatic of an illustrative embodiment of a hinge in accordance with the present invention.

A method for generating, on a second virtual canvas within the same 3D space, a 3D representation of an object disposed in 2D on a first or original, working virtual canvas may be facilitated by providing a hinge function at any desirable location and at any desirable orientation within the infinite 2D plane of the original, working virtual canvas. For example, referring to FIG. 1, a frontal-planar view of a 2D plane 10, e.g., a discrete portion of the infinite 2D plane 10, viewable on a display device of a user interface at some fixed distance from a virtual, imaging device, e.g., a virtual camera, is shown. As will be described in greater detail below, if only a discrete object or objects in the scene of the original, working virtual canvas has been selected for rotation about the hinge 15, the distance of the selected object or objects from the virtual camera becomes the distance between the original, working virtual canvas 10 and the subsequent, second canvas.

In some implementations, the hinge 15 may appear, e.g., on the display device, as a line 13 on the original plane 10 that passes through the geometric centers of two knobs 11, 12, e.g., circular knobs. Those of ordinary skill in the art can appreciate that the line 13 may be used as an axis of rotation 13. Although the knobs 11, 12 shown have a circular geometry, this is done for illustrative purposes. Knobs 11, 12 having shapes other than circular may be used. Moreover, differently-shaped knobs 11, 12, e.g., triangles, rectangles, and the like, may be used as indicia that the rotation angle has exceeded some threshold value. For example, in some variations, once the rotation angle exceeds about 60 degrees, the shape of the knobs 11, 12 may automatically change from circular to triangular and/or when the rotation angle equals 90 degrees, the shape of the knobs 11, 12 may change from triangular to rectangular. As a result, the changing shape of the knobs 11, 12 serves as a subtle reminder to users who may be trying to create a special geometry on the original, working virtual canvas 10. This may be particularly useful when, for example, users are drafting or sketching a building with an orthogonal façade. Indeed, with the present invention, users do not have to concern themselves with one-point perspective projection, two-point vanishing perspective projection, and the like as the system accomplishes the perspective automatically.

Figure 5A:
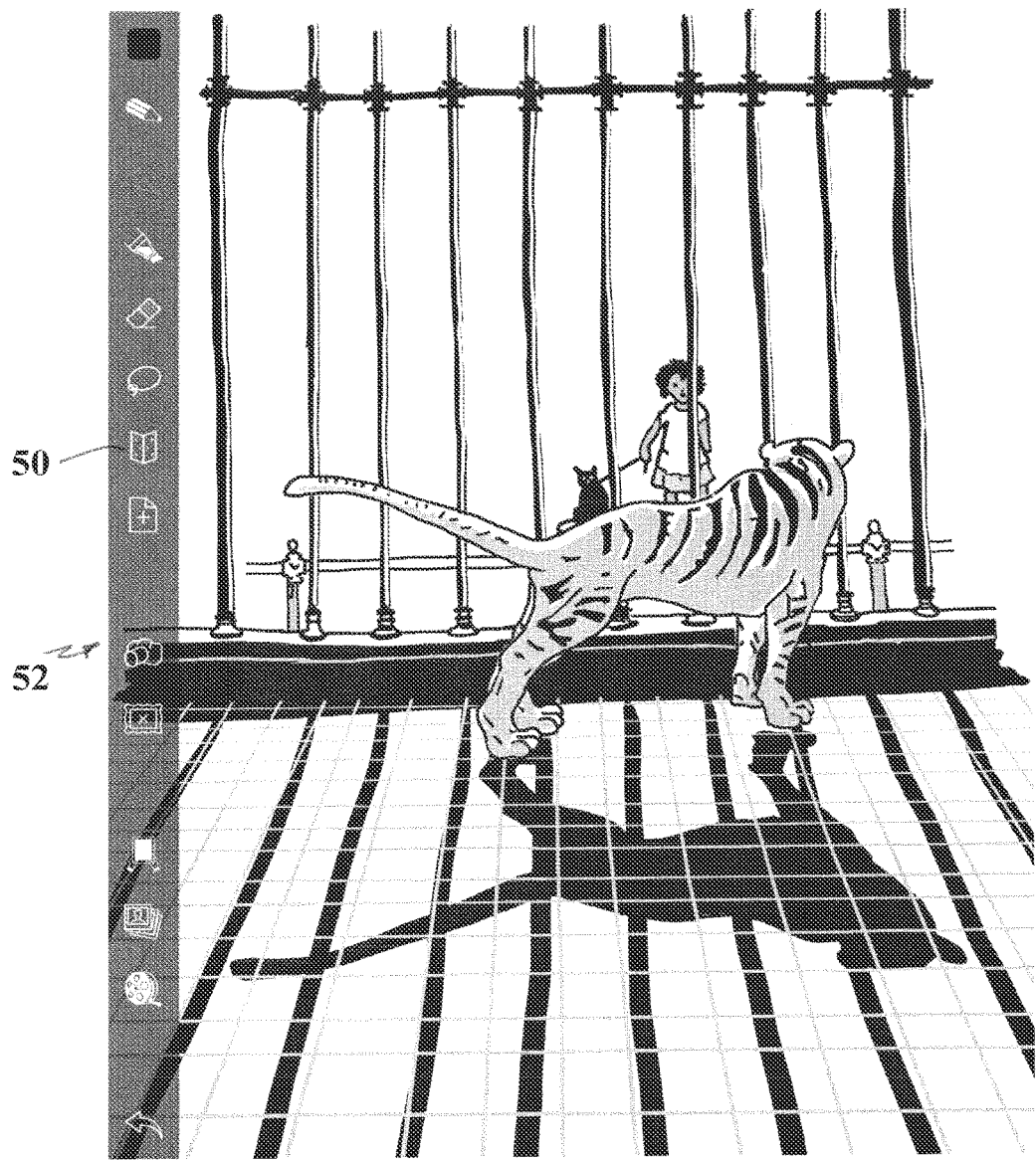
FIG. 5A shows an illustrative embodiment of an object in a working virtual canvas.
Figure 5B:
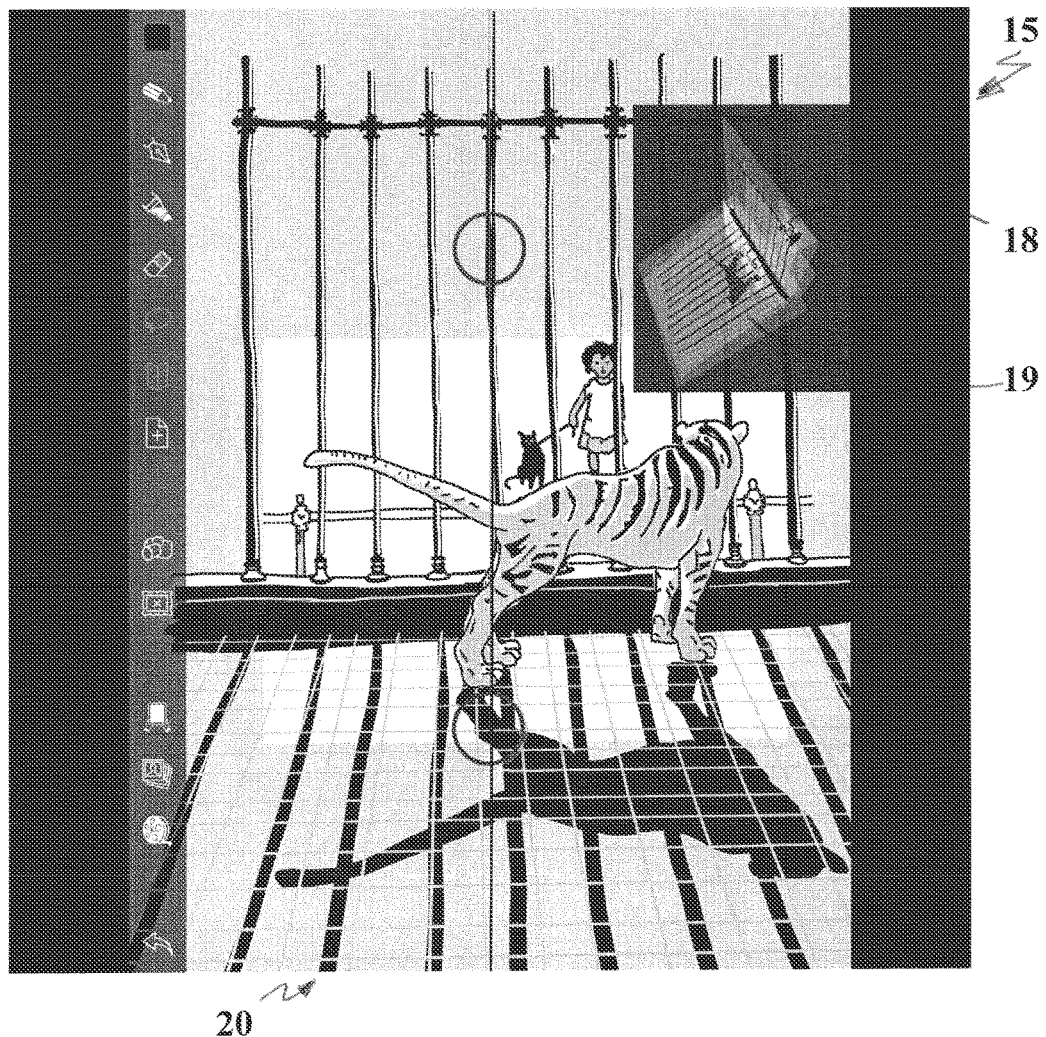
FIG. 5B shows an illustrative embodiment of the object in FIG. 5A with a hinge added in accordance with the present invention.
Figure 5C:
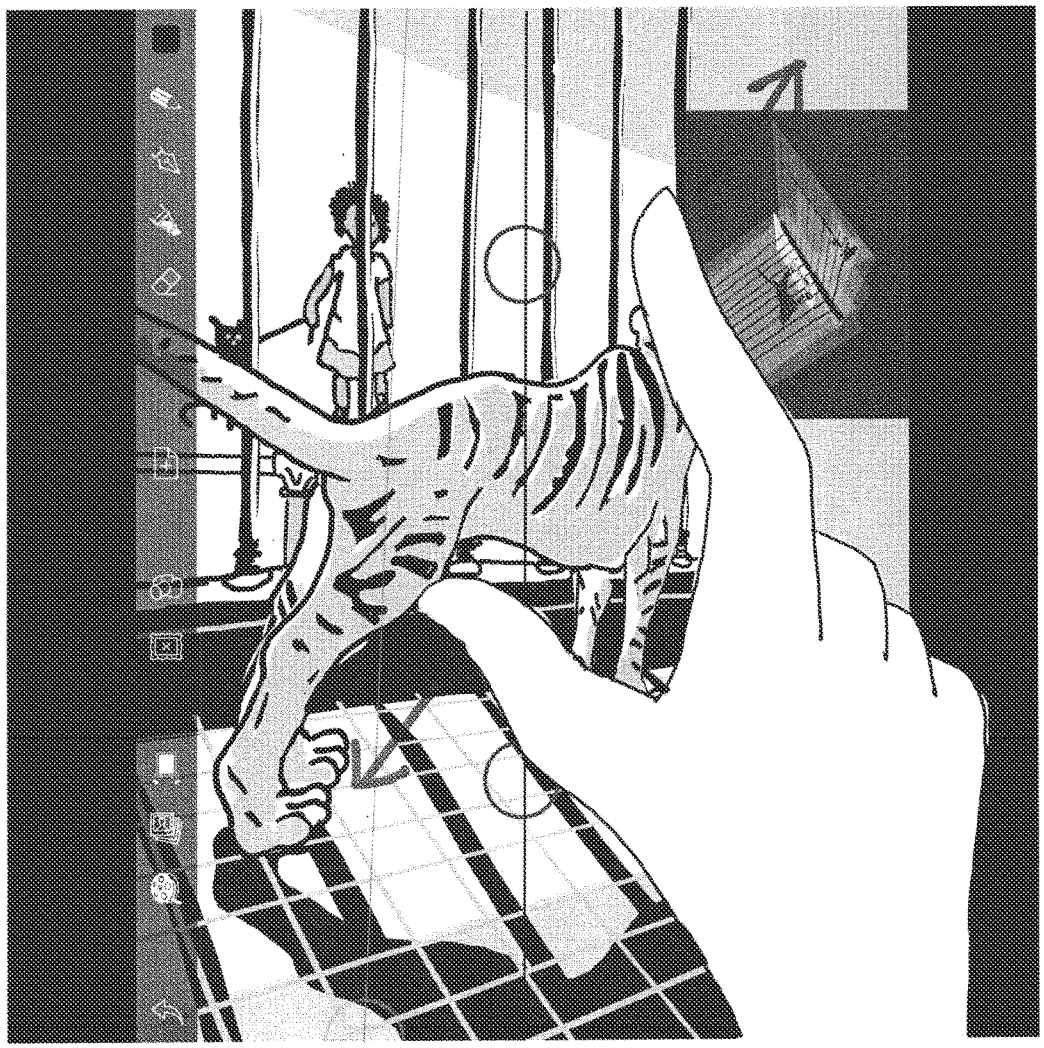
FIG. 5C shows an illustrative embodiment of a zooming in operation on the object in FIG. 5B in accordance with the present invention.
Figure 5D:
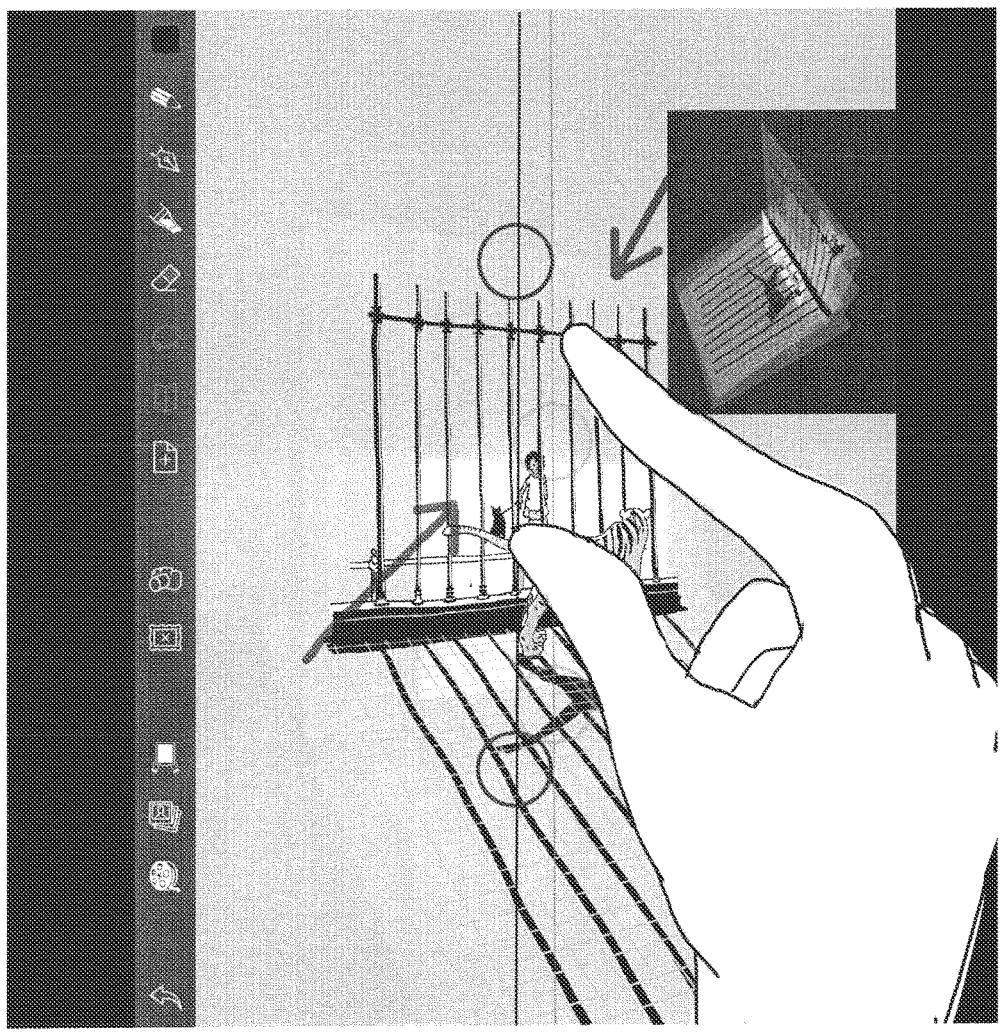
FIG. 5D shows an illustrative embodiment of a zooming out operation on the object in FIG. 5B in accordance with the present invention.
Figure 5E:
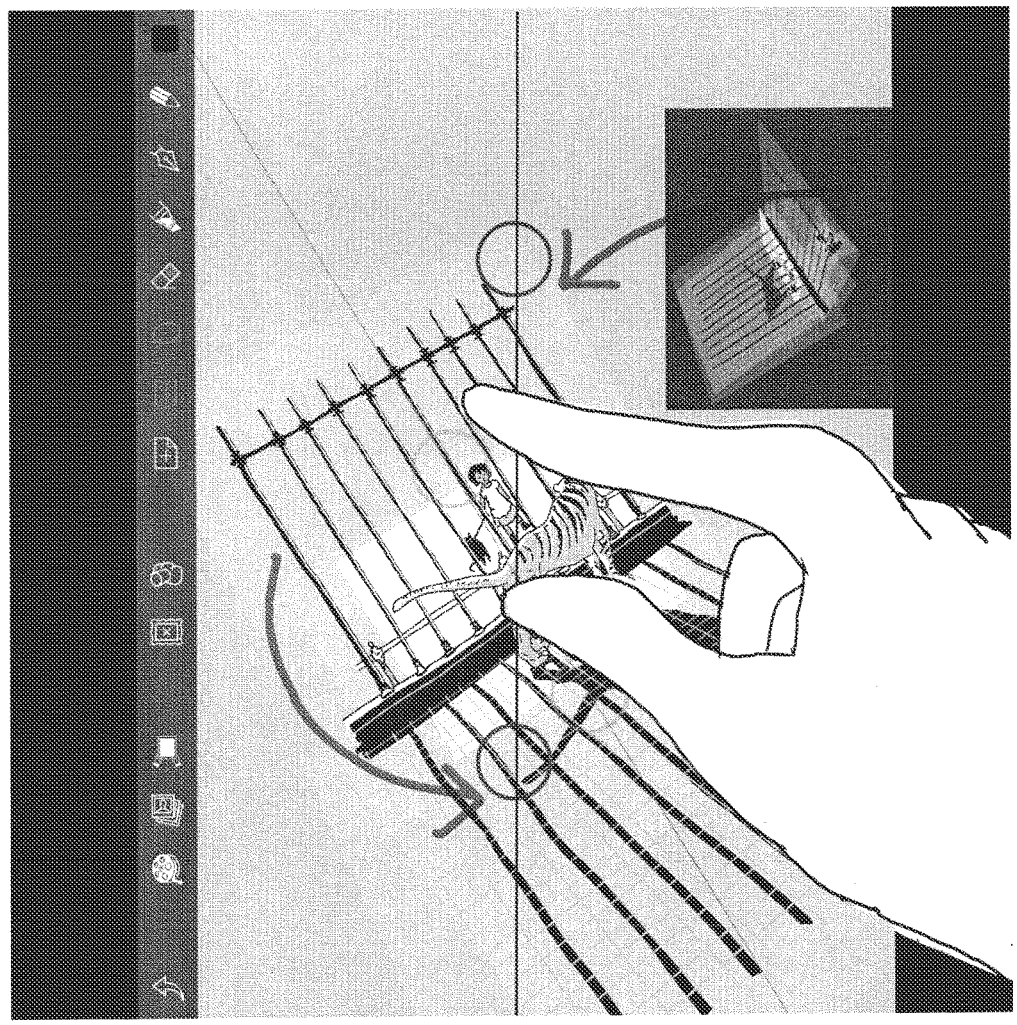
FIG. 5E shows an illustrative embodiment of a tilting operation on the object in FIG. 5D in accordance with the present invention.

In some implementations, a hinge icon 50 (FIG. 5A) may be displayed in a menu 52 disposed along the periphery of the display device. In practice, once the user clicks or double clicks on the icon 50, a hinge 15 comprising the line 13 and two knobs 11, 12 may appear on the display device, e.g., centered on the scene 20 shown by the display device (FIG. 5B). Optionally, when the hinge 15 appears, a 3D bird's-eye view 19 of the original, working virtual canvas 10 within 3D space may also be generated and displayed on the display device, e.g., in an inset 18 in an upper or lower corner of the display device. Generation of a hinge 15 does not affect the capabilities of the sketching software. Indeed, even once a hinge 15 has been displayed on the original, working virtual canvas, the user may continue to add content to the scene. Furthermore, once a hinge 15 has been generated, users may still manipulate the image, e.g., re-sizing the scene 20 by zooming in (FIG. 5C) and by zooming out (FIG. 5D), twisting (FIG. 5E), and so forth.

Figure 2:
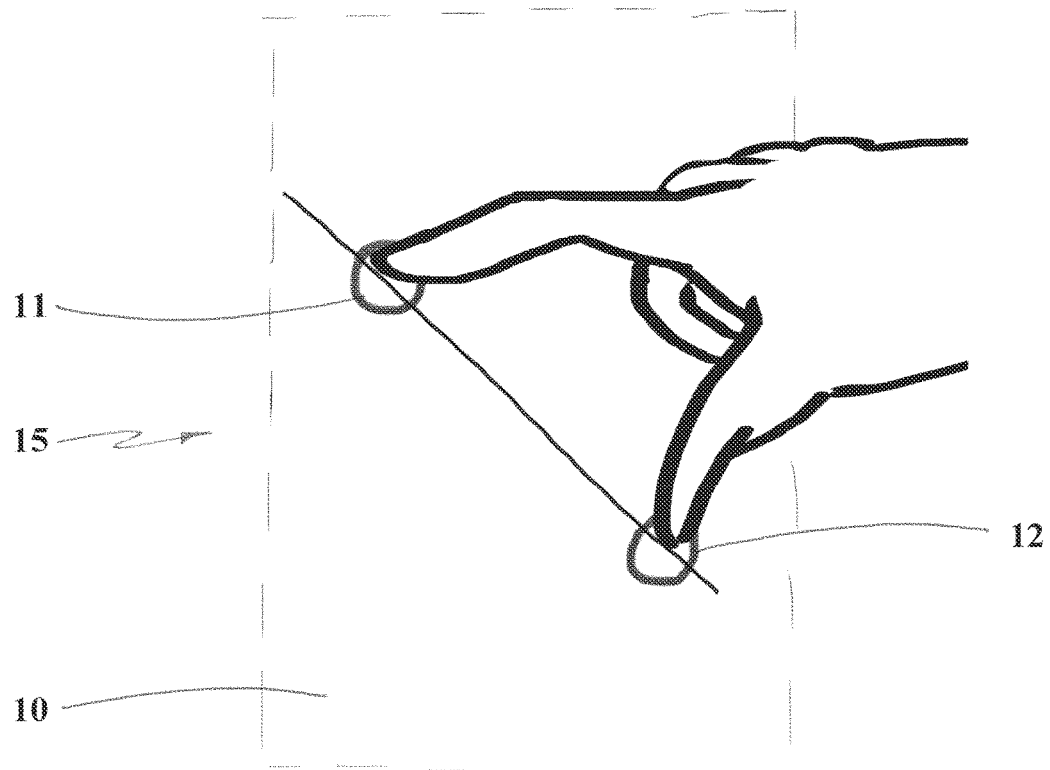
FIG. 2 shows a diagrammatic of an illustrative means for changing the location and orientation of the hinge of FIG. 1.

Advantageously, the hinge 15 may also be translated to be positioned at any location and tilted to be in any orientation on the 2D plane 10. For example, referring to FIGS. 2 and 5E, a multi-digit gesture may be used to move and tilt the hinge 15 and hence the scene 20. For example, in some variations, placing the user's thumb and index finger, respectively in the lower knob 12 and the upper knob 11, enables users to drag the hinge 15 and to tilt the hinge 15. In other implementations, the user's thumb and index finger do not actually have to be disposed within the knobs, 12, 11 in order to translate and/or tilt the scene 20 with respect to the hinge 15.

Figure 3:
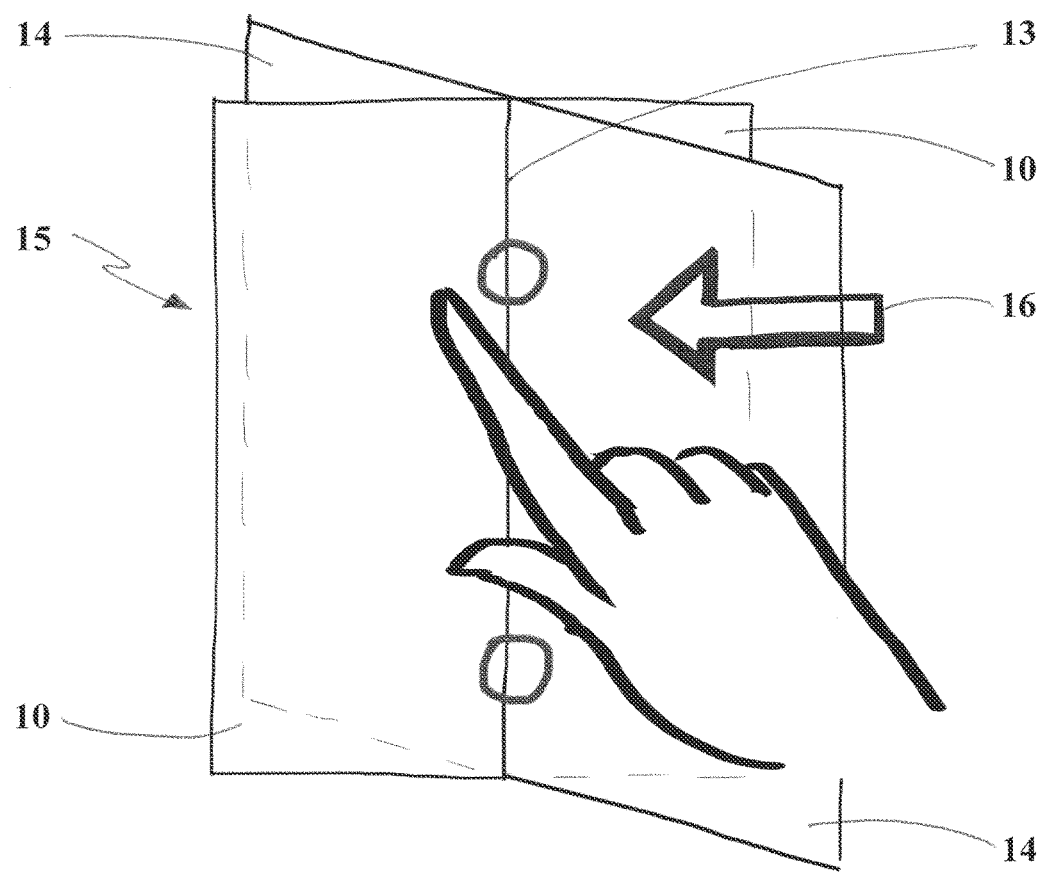
FIG. 3 shows a diagrammatic of an illustrative means for rotating a working virtual screen about the hinge of FIG. 1 to create a new virtual screen.

Referring to FIG. 3, once a hinge 15 has been positioned and oriented in the scene 20 in the original, working virtual canvas 10 as desired, users may generate or create an infinite number of new, second canvases 14, e.g., by dragging a single digit, e.g., the user's index finger, in a direction 16 that is orthogonal or substantially orthogonal to the orientation of the hinge 15. Dragging a single digit across the display device, while causing the scene displayed on the display device to remain in a frontal-planar aspect or view, causes the scene 20 to rotate or orbit about the axis of rotation 13. Indeed, as the user continues to drag her digit away from the axis of rotation 13 qua hinge 15, the scene 20 and the original, working virtual canvas 10 are projected from the original, working virtual canvas 10 to a new, second canvas 14 as the scene rotates or orbits about the axis of rotation 13. Although, in FIG. 3, the finger drag direction 16 is from right to left, which causes the original, working virtual canvas 10 to rotate about the axis of rotation 13 from right to left, the finger drag direction may also be from left to right, which would cause the original, working virtual canvas 10 to rotate about the axis of rotation 13 from left to right.

Figure 6A:
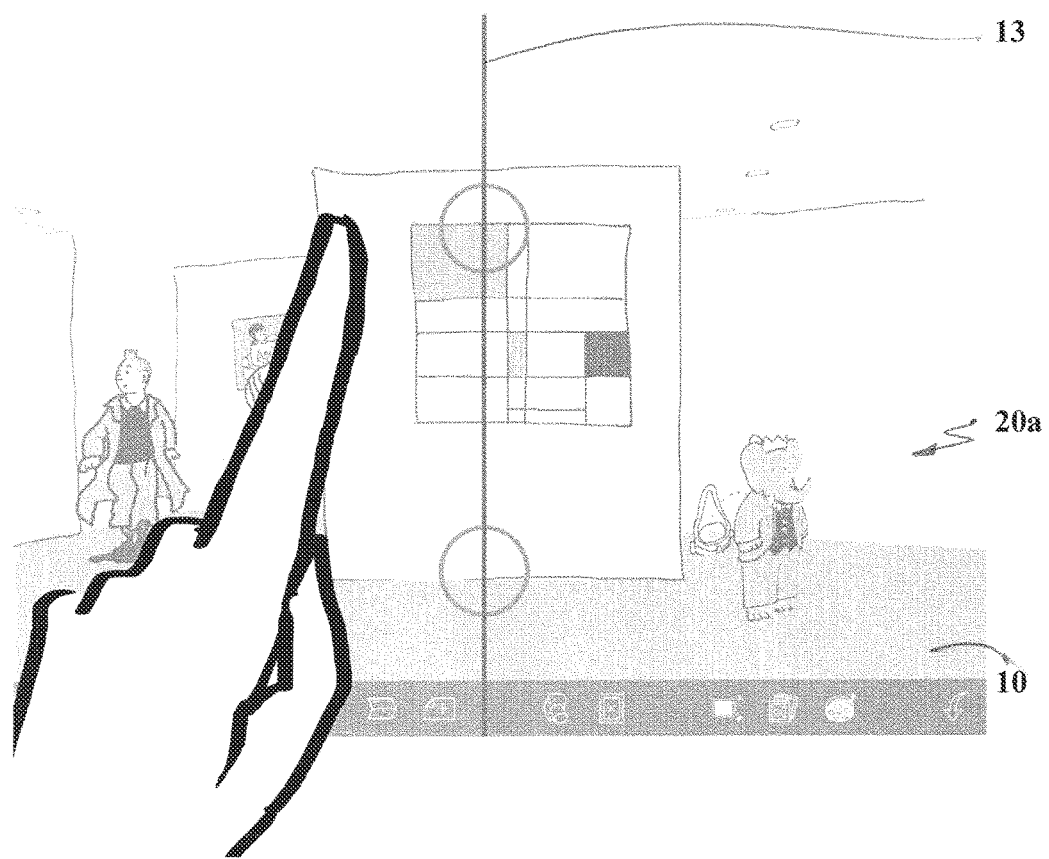
FIG. 6A shows an illustrative embodiment of an object in a working virtual canvas with a hinge added in accordance with the present invention.
Figure 6B:
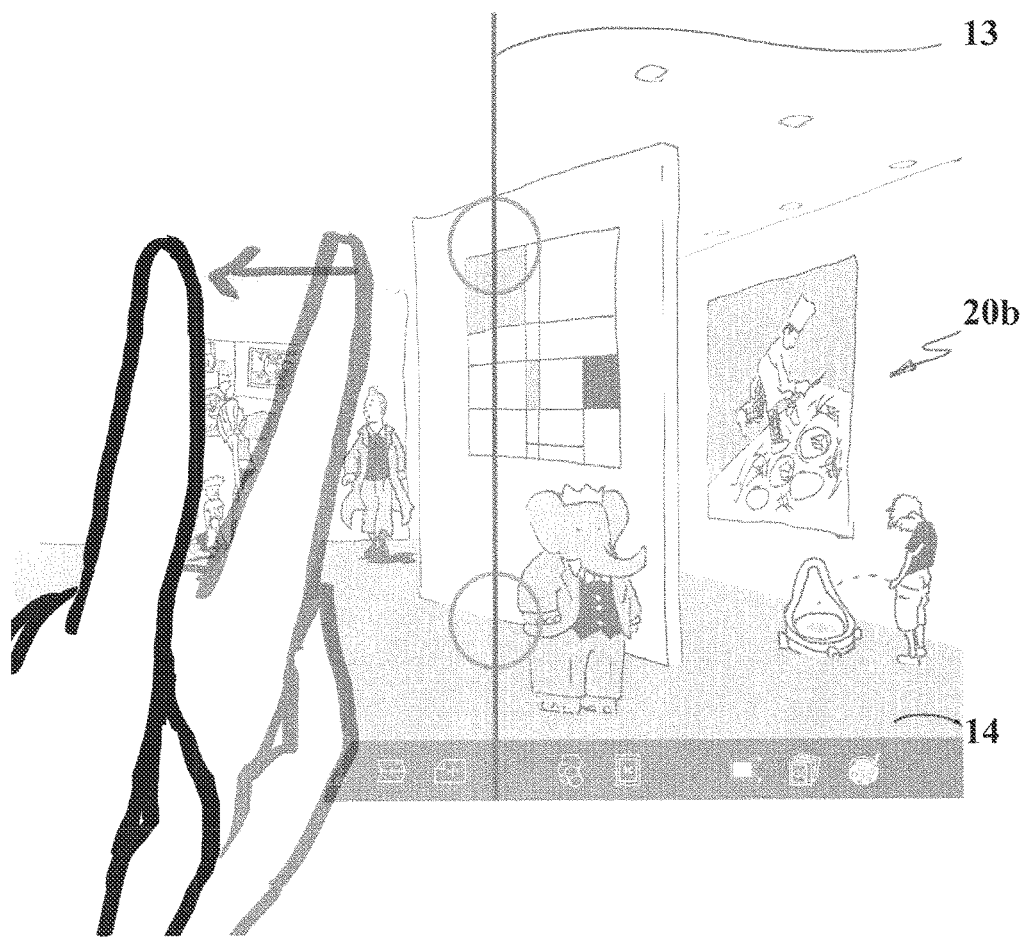
FIG. 6B shows an illustrative embodiments of a rotation operation of the object in FIG. 6A in accordance with the present invention.

The effects of rotation about the hinge 15, especially the effects of stroke projection and perspective, are shown in FIGS. 6A and 6B. FIG. 6A shows a scene 20a on an original, working virtual canvas 10 while FIG. 6B shows the stroke projection of the scene 20b onto a new virtual canvas 14 after rotation of the scene 20a about the axis of rotation 13. Whereas conventional practice has been to use parallel projection techniques for stroke projection, the present invention uses angular projection, and more particularly vector graphics to provide a 3D representation of an object in a 2D canvas.

Figure 7A:
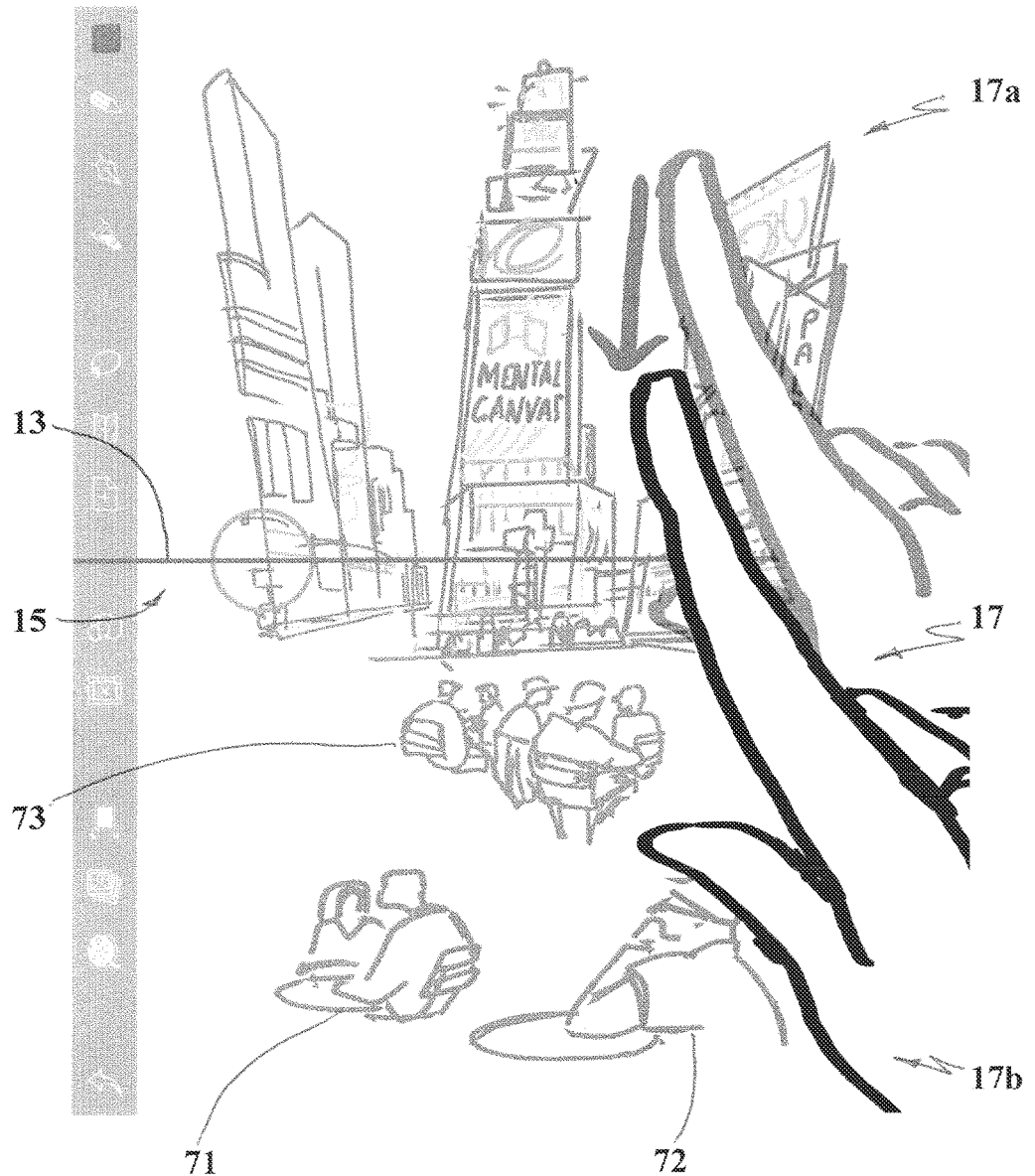
FIG. 7A shows an illustrative embodiment of an object in a working virtual canvas with a hinge added in accordance with the present invention.

Although the discussion to this point has described a situation in which an entire scene on an original, working virtual canvas 10 is rotated or orbited about the axis of rotation 13 of a hinge 15, the present invention also enables users to select discrete objects or even individual strokes on the original, working virtual canvas 10 to rotate about a hinge 15. As previously mentioned, when a discrete object or objects in the scene 20a of the original, working virtual canvas 10 has been selected, the distance of the selected object or objects from the virtual camera becomes the distance between the original, working virtual canvas 10, i.e., the plane of the original, working virtual canvas 10, and the subsequent, second canvas 14, i.e., the plane of the subsequent, second canvas 14. For example, in FIG. 7A, assume that the user has designated the people sitting at tables 71, 72, and 73 in the foreground of the scene 17, e.g., by highlighting the people sitting at tables 71, 72, and 73 using a highlighting feature, and has positioned the axis of rotation 13 of the hinge 15 as shown, to divide the scene 17 into an upper portion 17a, comprising the upper floors of some buildings in Times Square, New York, and a lower portion 17b, comprising people sitting at tables 71, 72, and 73 and the lower portions of the buildings. As the user drags her index finger in a direction towards the hinge 15 (as shown in FIG. 7A), the buildings in the upper portion 17a of the scene 17, which were not selected, remain relatively unchanged. In contrast, as the user drags her index finger in a direction towards the hinge 15 (as shown in FIG. 7A), the lower portion 17b of the scene 17 are rotated up, towards the axis of rotation 13 (FIG. 7B) so that the people sitting at tables 71, 72, and 73 are positioned between the virtual camera and the distant buildings of the upper portion 17a of the scene 17.

Figure 7B:
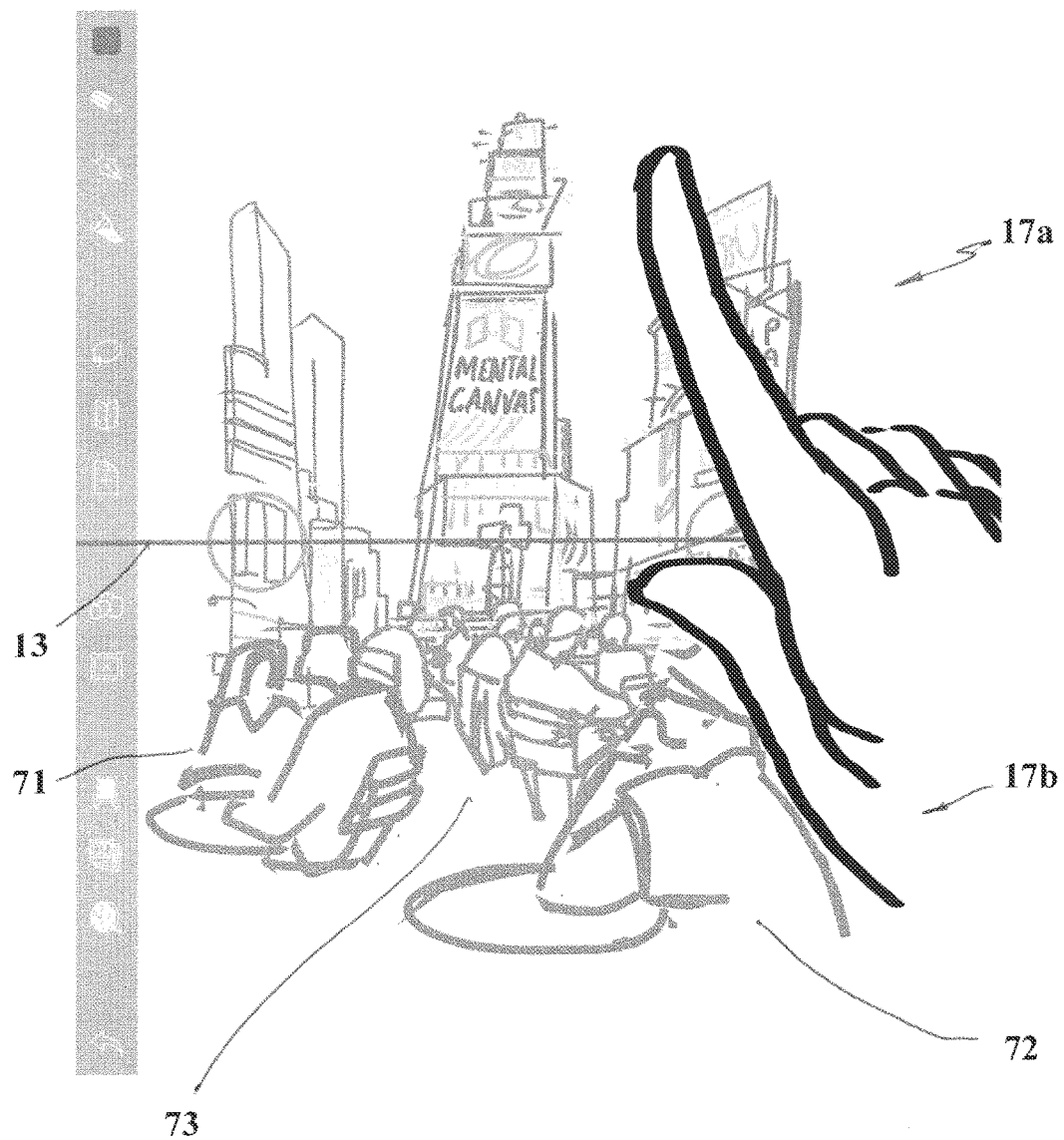
FIG. 7B shows an illustrative embodiments of a rotation operation of the object in FIG. 7A in accordance with the present invention.

As described in U.S. Published Patent Application Number 2013/0222385 to Julie Dorsey, et al., and as shown in FIG. 7B, the user may also designate the people sitting at tables 71, 72, and 73 as occlusions, e.g., using an occlusion icon, so that, as rotating the lower portion 17b causes the people sitting at tables 71, 72, and 73 to overlap the distant buildings, those portions of the more distant buildings that intersect, i.e., by the overlap, the more proximate people sitting at tables 71, 72, and 73 are not visible through the people sitting at tables 71, 72, and 73. The use of occlusions can also be seen in FIGS. 6A and 6B in which, after orbiting the scene 20a about the axis of rotation, the wall near "King Babar" occludes a painting of a chef on a wall behind Babar and Babar himself occludes a rendering of Duquesnoy's "Manneken Pis."

Advantageously, during any operation with the hinge 15, the scene and objects in the scene are displayed to the user in a frontal-planar aspect. As a result, despite the many rotations and meanderings of the user through the 3D space, the user may more easily know where she is within the 3D space.

Figure 8:
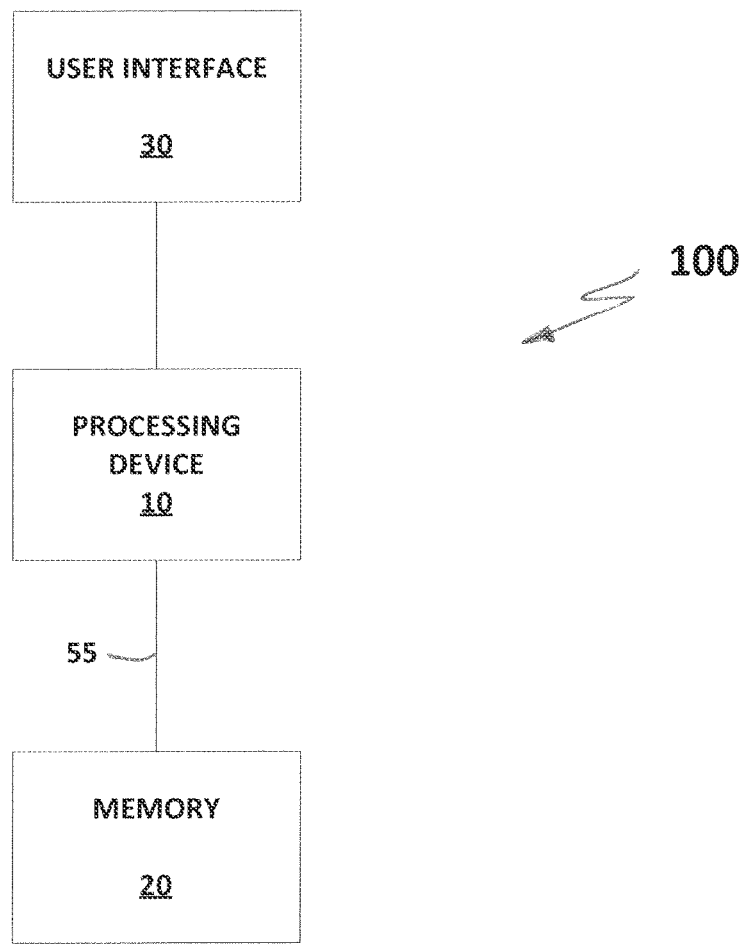
FIG. 8 shows a system for generating on a second virtual canvas within a three-dimensional space a three-dimensional representation of an object disposed on a plane of a first, working virtual canvas without leaving the plane of the first, working virtual canvas.

Having described a method, a computer graphics system 100 for generating on a second virtual canvas within a 3D space a 3D representation of an object disposed on a first or original, working virtual canvas without leaving the plane of the first, working virtual canvas will be described. Referring to FIG. 8, in some embodiments, the system 100 includes a processing device 10, memory 20, and a user interface 30 that are in electronic communication with each other via wireless or hard-wired communication. Components of the system 100 may be coupled by an interconnection element such as a bus 55. The bus 55 enables communications, e.g., the transfer of data and instructions, to be exchanged, e.g., wirelessly or by hardware, internally between components and externally between system components. Thus, the bus 55 may include one or more physical busses, e.g., between components that are integrated within the system 100, as well as a communication coupling between system elements, e.g., specialized or standard computing bus technologies such as IDE, SCSI, PCI, and InfiniBand. In some variations, components of the system 100 may be disposed in the same physical server and, thus, physical connectivity between the components may not be required.

The processing device 10 may include an operating system that manages at least a portion of the hardware elements included therein. Usually, a processing device 10 or controller executes an operating system which may be, for example, a Windows-based operating system (e.g., WINDOWS 7™, WINDOWS 2000™ (WINDOWS ME™), WINDOWS XP™ operating systems, and the like, available from the Microsoft Corporation), a MAC OS SYSTEM X™ operating system available from APPLE™ Computer, a Linux-based operating system distributions (e.g., the Enterprise Linux operating system, available from Red Hat Inc.) or a UNIX operating system available from various sources. Many other operating systems may be used, and embodiments are not limited to any particular implementation. Operating systems conventionally may be stored in memory 20.

The processing device 10 and the operating system together define a processing platform for which application programs in high-level programming languages may be written. These component applications may be executable, intermediate (for example, C–) or interpreted code which communicate over a communication network (for example, the Internet) using a communication protocol (for example, TCP/IP). Similarly, aspects in accordance with the present invention may be implemented using an object-oriented programming language, such as SmallTalk, JAVA™, C++, Ada, or C# (C-Sharp). Other object-oriented programming languages may also be used. Alternatively, functional, scripting, or logical programming languages may be used. For instance, aspects of the system may be implemented using an existing commercial product, such as, for example, Database Management Systems such as SQL Server available from Microsoft of Seattle, Washington, and Oracle Database from Oracle of Redwood Shores, California or integration software such as Web Sphere middleware from IBM of Armonk, N.Y. However, a computer system running, for example, SQL Server may be able to support both aspects in accordance with the present invention and databases for sundry applications not within the scope of the invention. In one or more of the embodiments of the present invention, the processing device 10 may be adapted to execute at least one application, algorithm, driver program, and the like. The applications, algorithms, driver programs, and the like that the processing device 10 may process and may execute can be stored in memory 20.

The processing device 10 may also perform functions outside the scope of the invention. In such instances, aspects of the system 100 may be implemented using an existing commercial product, such as, for example, Database Management Systems such as SQL Server available from Microsoft of Seattle, Washington, and Oracle Database (Spatial) from Oracle of Redwood Shores, Calif. or integration software such as Web Sphere middleware from IBM of Armonk, N.Y. However, a computer system running, for example, SQL Server may be able to support both aspects in accordance with the present invention and databases for sundry applications not within the scope of the invention.

"Memory" 20 may be used for storing programs and data during operation of the system 100. Memory 20 can be multiple components or elements of a data storage device(s) or, in the alternate, can be stand-alone devices. More particularly, memory 20 can include volatile storage, e.g., random access memory (RAM), and/or non-volatile storage, e.g., a read-only memory (ROM). The former may be a relatively high performance, volatile, random access memory such as a dynamic random access memory (DRAM) or static memory (SRAM). Various embodiments in accordance with the present invention may organize memory 20 into particularized and, in some cases, unique structures to perform the aspects and functions disclosed herein.

User interfaces 30, e.g., graphical user interfaces (GUI) and the like, provide a vehicle for human interaction, with a machine, e.g., the processing device 10, in which the human user provides input to direct the machine's actions while the machine provides output and other feedback to the user for use in future input. User interfaces 30 are well known to the art and will not be described in detail except in connection with the computer graphics system 100 of the present invention. In the current context, in some embodiments, the user interface 30 enables the user to create one or more virtual canvases, in an infinite 3D space, on which the user may place or enter one or more strokes to generate one or more objects for the purpose of viewing the object(s) in a 3D representation of a virtual scene comprising multiple objects or a single object with multiple features. As mentioned previously, the entire original working virtual canvas can be an "object" as that term is used herein. Although the system 100 will be described in terms of a single stroke or multiple strokes as objects, those skilled in the art can appreciate that the object could be any form of an image, texture, and so forth.

In some implementations, each virtual canvas is displayable on the display device associated with the user interface 30 in a frontal-planar aspect, showing on the virtual canvas, for example, a virtual scene as seen from a fixed, virtual camera location having a particular viewing angle. Through the user interface, using an input device, the user may generate a sketch by inserting, modifying, deleting, manipulating, and so forth strokes or other 2D objects or combination of objects that are projected onto the virtual canvas. Examples of input devices include, without limitation, the user's digits, a mouse, a joy stick, a stylus, and the like.

Figure 4:
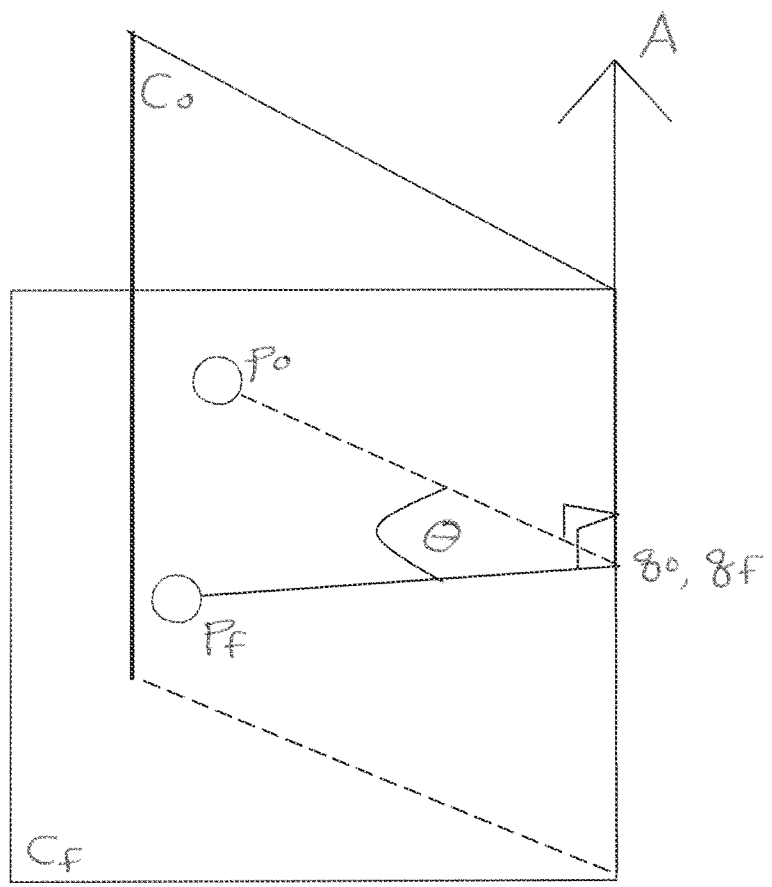
FIG. 4 shows a pair of two-dimensional planes in a three-dimensional space.

Because the present invention is meant to generate additional canvases in 3D space, stroke projection from one 2D canvas to another 2D canvas to create a 3D representation of a scene necessarily requires some form of projection and perspective. Conventionally, stroke projections in connection with computer graphics have used parallel projection and well known concepts of perspective, viewing angle, and so forth. According to the present invention, however, a stroke projection is by angular projection, using vector data and vector graphics. FIG. 4 shows a first or original canvas $C_o$ and a second or new canvas $C_f$ that intersect at an axis of rotation A associated with a hinge that lies in the plane of each canvas. If one were to project a pair of points p, q from a view position to the first canvas $C_o$ and to a fixed depth, front-planar plane, i.e., the second canvas $C_f$, the projection would produce a pair of touch points $p_o$ and $q_o$ on the original canvas $C_o$ as well as a pair of touch points $p_f$ and $p_f$ on the new canvas $C_f$, which is always at a frontal-planar aspect. So, passing points $p_o q_o$ to $p_f q_f$, the original canvas $C_o$ is rotated about the axis of rotation A to the new canvas $C_f$. As a result, the cross product of $p_o q_o$ and $p_f q_f$ can be used to determine the sine of the angle of rotation θ, which can be used in the vector graphics of the present invention. In short, the constraint that the second canvas remains in a frontal-planar aspect necessitates that passing points through the hinge line A uniquely determines the depth, i.e., the third dimension of a 2D image, of the new canvas $C_f$. Advantageously, this seamless transition from canvas to canvas enables users to start drawing on the frontal-planar canvas immediately.

Those of ordinary skill in the art may realize that the invention may be embodied in other specific forms without departing from the spirit or essential characteristics thereof. The foregoing embodiments, together with the attached drawings, are, therefore, to be considered in all respects illustrative rather than limiting of the invention described herein.

What we claim is:

1. A computer-implemented method for generating, within a three-dimensional space comprising a plurality of parallel and non-parallel virtual canvases, each virtual canvas including an object comprising at least one vector stroke and located on a two-dimensional plane, a second virtual canvas on a second two-dimensional plane within the three-dimensional space, the second virtual canvas comprising a three-dimensional representation of at least one vector stroke of an object disposed on an original two-dimensional plane of a first, working virtual canvas displayed in a frontal-planar orientation, the method comprising:

designating on the first, working virtual canvas, by user input, a set of vector strokes to be projected; and
after designating a set of vector strokes to be projected:
designating, by user input, an axis of rotation on the original two-dimensional plane of the first, working virtual canvas;
creating the second two-dimensional plane coincident with the original two-dimensional plane;
rotating, by user input, the second two-dimensional plane about the axis of rotation, such that the rotation of the second two-dimensional plane is restricted to remain in so as to continuously intersect the original two-dimensional plane at the designated axis of rotation;
performing a central projection of the designated set of selected vector strokes from the original two-dimensional plane of the first, working virtual canvas to the second two-dimensional plane of the second virtual canvas from the center of a virtual camera to a desired target on the second two-dimensional plane of the second virtual canvas; and
displaying the designated set of selected vector strokes on the second two-dimensional plane of the second virtual canvas.

2. The method of claim 1, wherein rotating the second two-dimensional plane about the axis of rotation comprises swiping a single finger gesture across a touch-sensitive screen in a direction that is perpendicular or substantially perpendicular to the axis of rotation.

3. The method of claim 1, wherein designating an axis of rotation comprises identifying on the original two-dimensional plane of the first, working virtual canvas a pair of screen points through which the axis of rotation passes.

4. The method of claim 3 wherein the pair of screen points are represented by a geometric figure selected from the group consisting a circle, an oval, a square, a rectangle, and a triangle.

5. The method of claim 1 further comprising modifying at least one of a location and an orientation of the axis of rotation by manipulating a relative location of each of the pair of screen points in the first, working virtual canvas.

6. The method of claim 5, wherein manipulating a relative location of each of the pair of screen points comprises dragging at least one of a multi-finger gesture and a hand gesture across a touch-sensitive screen to change at least one of the location and the orientation of the pair of points and the axis of rotation.

7. The method of claim 1, wherein visual accuracy of the object is maintained while changing the point of view of the object from the first, working virtual canvas to the second virtual canvas.

8. The method of claim 1, wherein the object is selected from the group consisting of at least one stoke, content, at least one sketch, at least one cartoon, at least one comic, at least one image, at least one drawing, at least one photograph, a text, at least one video, a two-dimensional plane, and any combination thereof.

9. The method of claim 1, wherein designating an axis of rotation on the original two-dimensional plane of the first, working virtual canvas comprises creating a selectively positionable hinge feature at which the rotating second two-dimensional plane continuously intersects the original two-dimensional plane.

10. The method of claim 9, further comprising rotating an object about the axis of rotation by swiping a single finger gesture across a touch-sensitive screen in a direction that is perpendicular or substantially perpendicular to the axis of rotation.

11. The method of claim 9 further comprising modifying at least one of a location and an orientation of the axis of rotation by manipulating a relative location of each of the pair of screen points through which the axis of rotation passes.

12. The method of claim 11, wherein manipulating a relative location of each of the pair of screen points comprises dragging at least one of a multi-finger gesture and a hand gesture across a touch-sensitive screen to change at least one of the location and the orientation of the pair of screen points and the axis of rotation.

13. A system for generating, within a three-dimensional space comprising a plurality of parallel and non-parallel virtual canvases, each virtual canvas including an object comprising at least one vector stroke and located on a two-dimensional plane, a second virtual canvas on a second two-dimensional plane within the three-dimensional space, the second virtual canvas comprising a three-dimensional representation of at least one vector stroke of an object disposed on an original two-dimensional plane of a first, working virtual canvas displayed in a frontal-planar orientation, the system comprising:
   a programmable processor; and
   memory for storing machine-readable instructions executable by the processor, wherein, when executed, the instructions cause the processor to:
      designate on the first, working virtual canvas, by user input, a set of vector strokes to be projected; and
      after designating a set of vector strokes to be projected:
         designate, by user input, an axis of rotation on the original two-dimensional plane of the first, working virtual canvas; and
         rotate, by user input, the second two-dimensional plane about the axis of rotation, such that the rotation of the second two-dimensional plane is restricted to remain in so as to continuously intersect the original two-dimensional plane at the designated axis of rotation;
         perform a central projection of the designated set of selected vector strokes on the original two-dimensional plane of the first, working virtual canvas to the second two-dimensional plane of the second virtual canvas from the center of a virtual camera to a desired target on the second two-dimensional plane of the second virtual canvas; and
         display the designated set of selected vector strokes on the second two-dimensional plane of the second virtual canvas.

14. An article of manufacture having computer-readable program portions embedded thereon for generating within a three-dimensional space comprising a plurality of parallel and non-parallel virtual canvases, each virtual canvas including an object comprising at least one vector stroke and located on a two-dimensional plane, a second virtual canvas on a second two-dimensional plane within the three-dimensional space, the second virtual canvas comprising a three-dimensional representation of at least one vector stroke of an object disposed on an original two-dimensional plane of a first, working virtual canvas displayed in a frontal-planar orientation, the embedded portions comprising instructions for:
   designating on the first, working virtual canvas, by user input, a set of vector strokes to be projected; and
   after designating a set of vector strokes to be projected:
      designating, by user input, an axis of rotation on the original two-dimensional plane of the first, working virtual canvas;
      creating the second two-dimensional plane coincident with the original two-dimensional plane; and
      rotating, by user input, the second two-dimensional plane about the axis of rotation, such that the rotation of the second two-dimensional plane is restricted to remain in so as to continuously intersect the original two-dimensional plane at the designated axis of rotation,
   performing a central projection of the designated set of selected vector strokes on the original two-dimensional plane of the first, working virtual canvas to the second two-dimensional plane of the second virtual canvas from the center of a virtual camera to a desired target on the second two-dimensional plane of the second virtual canvas; and
   displaying the designated set of selected vector strokes on the second two-dimensional plane of the second virtual canvas.

15. The article of claim 14, wherein the article comprises a user interface.

* * * * *